United States Patent
Conyers et al.

(10) Patent No.: US 7,554,946 B2
(45) Date of Patent: *Jun. 30, 2009

(54) DYNAMIC REALLOCATION OF BANDWIDTH AND MODULATION PROTOCOLS

(75) Inventors: David J. Conyers, Minneapolis, MN (US); Jeffrey J. Cannon, St. Louis Park, MN (US); Larry G. Fischer, Waseca, MN (US); Douglas D. Weaver, Plymouth, MN (US); Santosh K. Sonbarse, Eden Prairie, MN (US); William J. Mitchell, Eden Prairie, MN (US); Michael J. Hermel, Waseca, MN (US); Donald R. Bauman, Waseca, MN (US); Jerry Edward Toms, Shakopee, MN (US); Philip M. Wala, Waseca, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/020,053

(22) Filed: Jan. 25, 2008

(65) Prior Publication Data

US 2008/0137575 A1 Jun. 12, 2008

Related U.S. Application Data

(63) Continuation of application No. 11/094,947, filed on Mar. 31, 2005.

(51) Int. Cl.
*H04Q 7/00* (2006.01)
*H04Q 7/20* (2006.01)

(52) U.S. Cl. ........................ 370/329; 370/341; 370/349; 370/310; 455/452.2; 455/561; 455/450

(58) Field of Classification Search ................. 370/329, 370/341, 252, 310, 324, 332, 333; 455/452.2, 455/452.1, 450, 552.1, 557, 118, 313

See application file for complete search history.

(56) References Cited

U.S. PATENT DOCUMENTS 4,183,054 A 1/1980 Patisaul et al.

(Continued)

FOREIGN PATENT DOCUMENTS

EP 0391597 10/1990

(Continued)

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", , pp. 1171-1175, Publisher: IEEE.

*Primary Examiner*—Huy Q Phan
(74) *Attorney, Agent, or Firm*—Fogg & Powers LLC

(57) ABSTRACT

Systems for dynamic reallocation of bandwidth and modulation protocols is provided. In one embodiment, a radio head interface module comprises: a transmit buffer adapted to receive a data stream from a signal processing module and store the data stream as a page of data samples having a page header; a transmit engine; a digital upconverter, the transmit engine adapted to transfer the page of data samples from the transmit buffer to the digital upconverter; a configuration management unit adapted to receive reconfiguration information from the signal processing module, the reconfiguration information including at least one of air interface protocol parameters and bandwidth allocation information; and a memory adapted with digital upconverter parameters. The configuration management unit is accesses the memory to lookup associated digital upconverter parameters based on the reconfiguration information. The configuration management unit is further adapted to output the associated digital upconverter parameters to the digital up converter.

17 Claims, 5 Drawing Sheets

U.S. PATENT DOCUMENTS

| | | | |
|---|---|---|---|
| 4,569,042 A | 2/1986 | Larson | |
| 4,611,323 A | 9/1986 | Hessenmuller | |
| 4,628,501 A | 12/1986 | Loscoe | |
| 4,654,843 A | 3/1987 | Roza et al. | |
| 4,691,292 A | 9/1987 | Rothweiler | |
| 4,999,831 A | 3/1991 | Grace | |
| 5,184,347 A | 2/1993 | Farwell et al. | |
| 5,193,109 A | 3/1993 | Chien-Yeh Lee | |
| 5,243,598 A | 9/1993 | Lee | |
| 5,276,691 A | 1/1994 | Kivari | |
| 5,321,849 A | 6/1994 | Lemson | |
| 5,339,184 A | 8/1994 | Tang | |
| 5,544,222 A | 8/1996 | Robinson et al. | |
| 5,619,504 A | 4/1997 | Van Grinsven et al. | |
| 5,649,000 A | 7/1997 | Lee et al. | |
| 5,701,294 A | 12/1997 | Ward et al. | |
| 5,809,422 A | 9/1998 | Raleigh et al. | |
| 5,854,978 A | 12/1998 | Heidari | |
| 5,881,063 A * | 3/1999 | Bement et al. | 370/389 |
| 5,896,574 A * | 4/1999 | Bass, Sr. | 455/557 |
| 5,970,069 A | 10/1999 | Kumar et al. | |
| 5,978,688 A | 11/1999 | Mullins et al. | |
| 6,021,446 A | 2/2000 | Gentry, Jr. | |
| 6,047,002 A | 4/2000 | Hartmann et al. | |
| 6,091,765 A | 7/2000 | Pietzold, III et al. | |
| 6,097,733 A | 8/2000 | Basu et al. | |
| 6,188,898 B1 | 2/2001 | Phillips | |
| 6,219,561 B1 | 4/2001 | Raleigh | |
| 6,222,830 B1 | 4/2001 | Padovani et al. | |
| 6,233,456 B1 | 5/2001 | Schiff et al. | |
| 6,275,877 B1 | 8/2001 | Duda | |
| 6,363,421 B2 | 3/2002 | Barker et al. | |
| 6,381,289 B1 | 4/2002 | Dutta | |
| 6,434,366 B1 | 8/2002 | Harrison et al. | |
| 6,463,060 B1 | 10/2002 | Sato et al. | |
| 6,496,546 B1 | 12/2002 | Allpress et al. | |
| 6,501,785 B1 | 12/2002 | Chang et al. | |
| 6,584,146 B2 | 6/2003 | Bose et al. | |
| 6,633,545 B1 * | 10/2003 | Milbrandt | 370/252 |
| 6,636,747 B2 | 10/2003 | Harada et al. | |
| 6,654,428 B1 | 11/2003 | Bose et al. | |
| 6,715,007 B1 | 3/2004 | Williams et al. | |
| 6,728,228 B1 | 4/2004 | Ostman et al. | |
| 6,731,947 B2 * | 5/2004 | Hoagland et al. | 455/517 |
| 6,751,187 B2 | 6/2004 | Walton et al. | |
| 6,760,882 B1 | 7/2004 | Gesbert et al. | |
| 6,775,303 B1 | 8/2004 | Rustad et al. | |
| 6,775,305 B1 | 8/2004 | Delvaux | |
| 6,788,961 B2 | 9/2004 | Repice et al. | |
| 6,801,975 B1 | 10/2004 | Young | |
| 6,810,270 B1 | 10/2004 | Grohn et al. | |
| 6,829,229 B1 | 12/2004 | Palermo et al. | |
| 6,876,864 B1 | 4/2005 | Chapin | |
| 6,882,851 B2 | 4/2005 | Sugar et al. | |
| 6,889,354 B2 | 5/2005 | Feldman et al. | |
| 6,898,721 B2 | 5/2005 | Schmidt | |
| 6,912,228 B1 | 6/2005 | Dahlman et al. | |
| 6,931,074 B1 | 8/2005 | Palermo et al. | |
| 6,944,449 B1 | 9/2005 | Gandhi et al. | |
| 6,957,086 B2 | 10/2005 | Bahl et al. | |
| 6,977,930 B1 | 12/2005 | Epps et al. | |
| 7,006,442 B1 | 2/2006 | Abe et al. | |
| 7,016,668 B2 | 3/2006 | Vaidyanathan et al. | |
| 7,035,932 B1 | 4/2006 | Dowling | |
| 7,058,789 B2 | 6/2006 | Henderson et al. | |
| 7,069,574 B1 | 6/2006 | Adams et al. | |
| 7,072,413 B2 | 7/2006 | Walton et al. | |
| 7,099,346 B1 | 8/2006 | Kanterakis | |
| 7,099,687 B1 | 8/2006 | Makela et al. | |
| 7,103,044 B1 | 9/2006 | Keller et al. | |
| 7,116,682 B1 | 10/2006 | Waclawsky et al. | |
| 7,151,925 B2 | 12/2006 | Ting et al. | |
| 7,190,682 B2 | 3/2007 | Shepherd et al. | |
| 7,191,262 B2 * | 3/2007 | Sleeman | 710/62 |
| 7,203,488 B2 | 4/2007 | Luneau | |
| 7,269,200 B2 | 9/2007 | Igarashi | |
| 7,315,571 B1 | 1/2008 | Heidari et al. | |
| 7,324,786 B2 | 1/2008 | Parker | |
| 7,373,164 B2 | 5/2008 | Iacono et al. | |
| 7,386,641 B2 | 6/2008 | Xu et al. | |
| 7,398,106 B2 * | 7/2008 | Conyers et al. | 455/557 |
| 7,423,988 B2 * | 9/2008 | Hedin et al. | 370/322 |
| 2001/0024430 A1 | 9/2001 | Sekine et al. | |
| 2001/0031621 A1 | 10/2001 | Schmutz | |
| 2001/0037395 A1 | 11/2001 | Sabat, Jr. et al. | |
| 2002/0001337 A1 | 1/2002 | Chauncey et al. | |
| 2002/0035633 A1 | 3/2002 | Bose et al. | |
| 2002/0056066 A1 | 5/2002 | Gesbert et al. | |
| 2002/0078247 A1 | 6/2002 | Lu et al. | |
| 2002/0093983 A1 | 7/2002 | Newberg et al. | |
| 2002/0169894 A1 | 11/2002 | Takla | |
| 2002/0186436 A1 | 12/2002 | Mani et al. | |
| 2002/0186674 A1 | 12/2002 | Mani et al. | |
| 2002/0187809 A1 | 12/2002 | Mani et al. | |
| 2002/0191565 A1 | 12/2002 | Mani et al. | |
| 2003/0003880 A1 | 1/2003 | Ling et al. | |
| 2003/0016701 A1 * | 1/2003 | Hinson | 370/480 |
| 2003/0036359 A1 | 2/2003 | Dent et al. | |
| 2003/0050098 A1 | 3/2003 | D'Agati et al. | |
| 2003/0125040 A1 | 7/2003 | Walton et al. | |
| 2003/0142649 A1 | 7/2003 | Taniguchi | |
| 2004/0001429 A1 | 1/2004 | Ma et al. | |
| 2004/0005866 A1 | 1/2004 | Igarashi | |
| 2004/0033806 A1 | 2/2004 | Daniel et al. | |
| 2004/0042387 A1 | 3/2004 | Geile | |
| 2004/0046016 A1 | 3/2004 | Becker et al. | |
| 2004/0132477 A1 | 7/2004 | Lundby et al. | |
| 2004/0156328 A1 | 8/2004 | Walton et al. | |
| 2004/0156449 A1 | 8/2004 | Bose et al. | |
| 2004/0198410 A1 | 10/2004 | Shepherd et al. | |
| 2004/0198453 A1 | 10/2004 | Cutrer et al. | |
| 2004/0209580 A1 | 10/2004 | Bose et al. | |
| 2005/0002444 A1 | 1/2005 | Wei et al. | |
| 2005/0033519 A1 | 2/2005 | Fenton | |
| 2005/0041746 A1 | 2/2005 | Rosen et al. | |
| 2005/0083876 A1 | 4/2005 | Vialen et al. | |
| 2005/0138383 A1 | 6/2005 | Vainstein | |
| 2005/0147024 A1 | 7/2005 | Jung et al. | |
| 2005/0190855 A1 | 9/2005 | Jin et al. | |
| 2005/0280564 A1 | 12/2005 | Lee | |
| 2006/0015674 A1 | 1/2006 | Murotake | |
| 2006/0034242 A1 | 2/2006 | Proctor, Jr. | |
| 2006/0141957 A1 | 6/2006 | Fischer et al. | |
| 2006/0206628 A1 | 9/2006 | Erez | |
| 2006/0221913 A1 | 10/2006 | Hermel et al. | |
| 2006/0222019 A1 | 10/2006 | Hedin et al. | |
| 2006/0222020 A1 | 10/2006 | Hedin et al. | |
| 2006/0222054 A1 * | 10/2006 | Conyers et al. | 375/132 |
| 2006/0222087 A1 | 10/2006 | Bauman et al. | |
| 2006/0223468 A1 | 10/2006 | Toms et al. | |
| 2006/0223514 A1 | 10/2006 | Weaver et al. | |
| 2006/0223515 A1 | 10/2006 | Hermel et al. | |
| 2006/0223572 A1 | 10/2006 | Hedin et al. | |
| 2006/0223578 A1 | 10/2006 | Conyers et al. | |
| 2006/0227736 A1 * | 10/2006 | Conyers et al. | 370/328 |
| 2006/0227737 A1 | 10/2006 | Hedin et al. | |
| 2006/0227805 A1 | 10/2006 | Hedin et al. | |
| 2007/0032241 A1 | 2/2007 | Busch et al. | |
| 2008/0025211 A1 | 1/2008 | Karaoguz et al. | |
| 2008/0137575 A1 | 6/2008 | Conyers et al. | |
| 2008/0168199 A1 * | 7/2008 | Conyers et al. | 710/106 |
| 2008/0254784 A1 * | 10/2008 | Hedin et al. | 455/418 |

FOREIGN PATENT DOCUMENTS

| | | |
|---|---|---|
| EP | 0936453 | 8/1999 |
| EP | 1211817 | 6/2002 |
| WO | 9115927 | 10/1991 |
| WO | 0159993 | 8/2001 |
| WO | 2004047316 | 6/2004 |

* cited by examiner

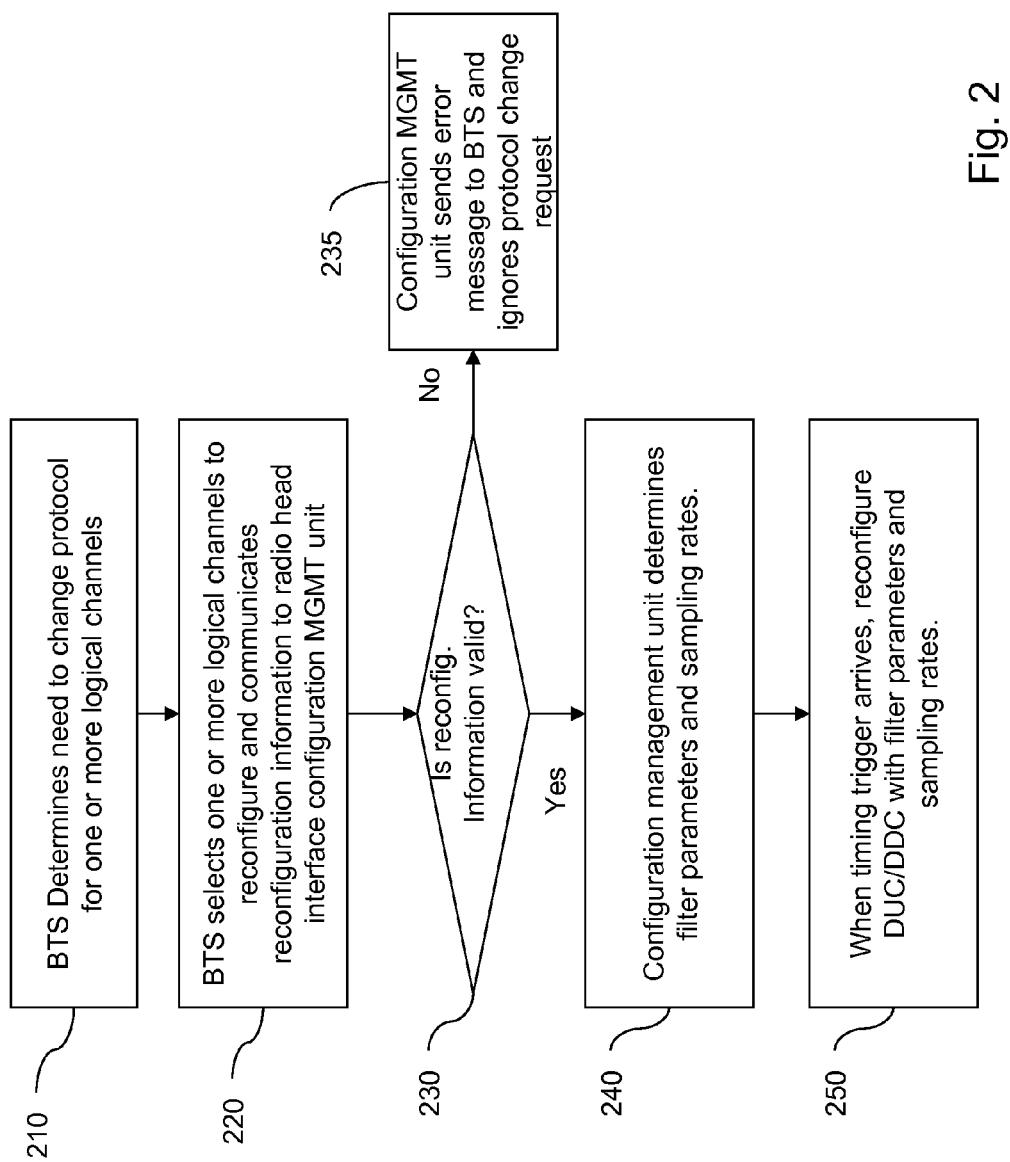

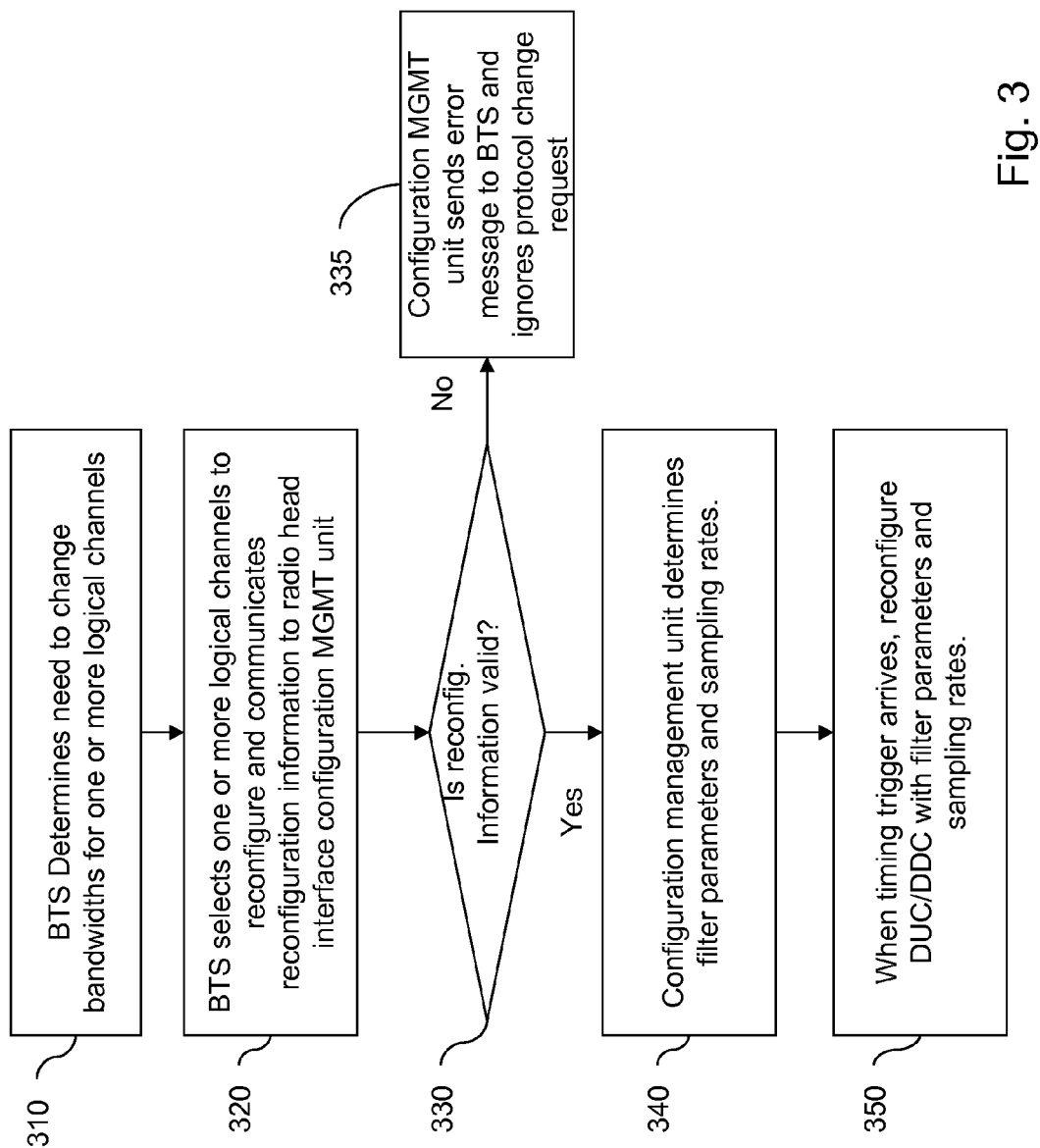

DYNAMIC REALLOCATION OF BANDWIDTH AND MODULATION PROTOCOLS

CROSS REFERENCES TO RELATED APPLICATIONS

This application is a continuation of application Ser. No. 11/094,947 filed on Mar. 31, 2005, entitled "DYNAMIC REALLOCATION OF BANDWIDTH AND MODULATION PROTOCOLS" (currently pending) which is hereby incorporated herein by reference.

This application is related to the following co-pending United States patent applications filed on Mar. 31, 2005, all of which are hereby incorporated herein by reference:

U.S. patent application Ser. No. 11/095,788, filed on Mar. 31, 2005 and entitled "DYNAMIC FREQUENCY HOPPING") and which is referred to here as the '672 Application;

U.S. patent application Ser. No. 11/095,628, filed on Mar. 31, 2005 and entitled "DYNAMIC DIGITAL UP AND DOWN CONVERTERS" and which is referred to here as the '673 Application;

U.S. patent application Ser. No. 11/095,789, filed on Mar. 31, 2005 and entitled "DYNAMIC RECONFIGURATION OF RESOURCES THROUGH PAGE HEADERS" and which is referred to here as the '675 Application;

U.S. patent application Ser. No. 11/094,848, filed on Mar. 31, 2005 and entitled "SIGNAL ENHANCEMENT THROUGH DIVERSITY" and which is referred to here as the '676 Application;

U.S. patent application Ser. No. 11/095,111, filed on Mar. 31, 2005 and entitled "SNMP MANAGEMENT IN A SOFTWARE DEFINED RADIO" and which is referred to here as the '677 Application;

U.S. patent application Ser. No. 11/095,112, filed on Mar. 31, 2005 and entitled "TIME STAMP IN THE REVERSE PATH" and which is referred to here as the '678 Application;

U.S. patent application Ser. No. 11/094,949, filed on Mar. 31, 2005 and entitled "BUFFERS HANDLING MULTIPLE PROTOCOLS" and which is referred to here as the '679 Application;

U.S. patent application Ser. No. 11/095,113, filed on Mar. 31, 2005 and entitled "TIME START IN THE FORWARD PATH" and which is referred to here as the '680 Application;

U.S. patent application Ser. No. 11/094,950 filed on Mar. 31, 2005 entitled "LOSS OF PAGE SYNCHRONIZATION" and which is referred to here as the '681 Application;

U.S. patent application Ser. No. 11/094,907, filed on Mar. 31, 2005 and entitled "DYNAMIC READJUSTMENT OF POWER" and which is referred to here as the '685 Application;

U.S. patent application Ser. No. 11/095,150, filed on Mar. 31, 2005 and entitled "METHODS AND SYSTEMS FOR HANDLING UNDERFLOW AND OVERFLOW IN A SOFTWARE DEFINED RADIO" and which is referred to here as the '686 Application; and U.S. patent application Ser. No. 11/095,779, filed on Mar. 31, 2005 and entitled "INTEGRATED NETWORK MANAGEMENT OF A SOFTWARE DEFINED RADIO SYSTEM" and which is referred to here as the '700 Application.

TECHNICAL FIELD

The following description relates to communication systems and in particular to wireless communication systems.

BACKGROUND

Many changes are taking place in the way wireless communication networks are being deployed. Some of the changes are being driven by the adoption of new mobile communications standards. The introduction of software defined radios to wireless telecommunications has led to the generation of software and hardware solutions to meet the new standards. Current mobile communication standards introduce physical and logical channels and pose new issues in the transport of information within the communication networks.

A software defined radio (SDR) uses software for the modulation and demodulation of radio signals. The use of reprogrammable software allows key radio parameters, such as frequency and modulation protocols to be modified without the need to alter the underlying hardware of the system. Additionally, SDRs allow a single device to support multiple configurations which previously would have required multiple hardware devices. One example of a software defined radio is the Vanu Software Radio produced by Vanu, Inc. (See U.S. Pat. No. 6,654,428).

One problem with current mobile communication standards is the number of distinct modulation standards that may be in use within a geographic region and the ability for wireless communication network providers to adapt their network hardware for the various protocols. Current modulation standards that a wireless communication network may operate with includes, but is not limited to, Advanced Mobile Phone System (AMPS), code division multiple access (CDMA), Wide-band CDMA (WCDMA), time division multiple access (TDMA), Global System for Mobile communications (GSM), Cellular Digital Packet Data (CDPD), Enhanced Data rates for GSM Evolution (EDGE), General Packet Radio Service (GPRS), Integrated Digital Enhanced Network (iDEN), and Orthogonal Frequency Division Multiplexing (OFDM). Purchasing hardware designed to operate with only a single standard results in idle resources at times when network demand for that modulation standard is low. To avoid the expenses associated with operating and maintaining hardware dedicated to each standard, there is a need in the art today for communications network hardware that is modulation standard independent and can be dynamically reconfigured to support modulation standards based on the current demands on the network and operate with multiple standards simultaneously.

Another problem is that wireless communication transmissions are no longer limited to voice data, but now carry a spectrum of data from text messaging to real time streaming video from the Internet. Communications such as streaming video require significantly more bandwidth than transmitting a text message. However, when a logical channel is configured to support wide bandwidth communication data, available bandwidth is wasted when that same channel is used to carry lower bandwidth communications data (e.g. a short text message). There is a need in the art today for communication network hardware which has the ability to dynamically allocate radio bandwidth based on the type of data being transmitted.

For the reasons stated above, and for other reasons stated below that will become apparent to those skilled in the art upon reading and understanding the present specification, there is a need in the telecommunications industry for solutions for implementing dynamic protocol reconfiguration and dynamic bandwidth reallocation for software defined radios.

SUMMARY

Embodiments of the present invention address the problem of frequency coordination of base station components and mobile devices implementing dynamic protocol reconfiguration and dynamic bandwidth reallocation, as well as other problems and will be understood by reading and studying the following specification.

In one embodiment, a radio head interface module comprises: a transmit buffer adapted to receive a data stream from a signal processing module and store the data stream as a page of data samples having a page header; a transmit engine; a digital upconverter, the transmit engine adapted to transfer the page of data samples from the transmit buffer to the digital upconverter; a configuration management unit adapted to receive reconfiguration information from the signal processing module, the reconfiguration information including at least one of air interface protocol parameters and bandwidth allocation information; and a memory adapted with digital upconverter parameters. The configuration management unit is accesses the memory to lookup associated digital upconverter parameters based on the reconfiguration information. The configuration management unit is further adapted to output the associated digital upconverter parameters to the digital up converter.

DRAWINGS

The present invention is more easily understood and further advantages and uses thereof more readily apparent, when considered in view of the description of the preferred embodiments and the following figures in which:

FIG. 2 is flow chart of one embodiment of dynamic protocol configuration of one embodiment of the present invention.

FIG. 3 is flow chart of dynamic reallocation of bandwidth of one embodiment of the present invention.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide methods and systems to implement a bandwidth allocation and protocol selection function for mobile communications systems.

Embodiments of the present invention concern portions of a cellular telecommunications network that typically comprises one or more cellular antennas, a remote unit (also called a radio head) transmitting and receiving voice and/or data communications over the cellular antennas, and a base station (also commonly called a base transceiver station (BTS), or a server) that communicates data between the remote unit and a larger communication network (e.g. the public switched telephone network, or the Internet).

In some embodiments, communications between a BTS and a remote unit take place through two sets of data streams. Typically, forward logical channels carry data from the BTS through the radio head to an end user device. Reverse logical channels carry data from end user devices through the radio head to the BTS. Each logical channel is assigned a radio frequency (RF) channel and a modulation protocol, which the communications network uses to wirelessly communicate data with individual cellular devices. Embodiments of the present invention provide methods and systems for reconfiguring the modulation protocol and signal bandwidth allocation used by SDR logical channels. Details pertaining to reconfiguring the radio frequency used by a SDR logical channel are provided in the '672 Application herein incorporated by reference.

Figure 1A:
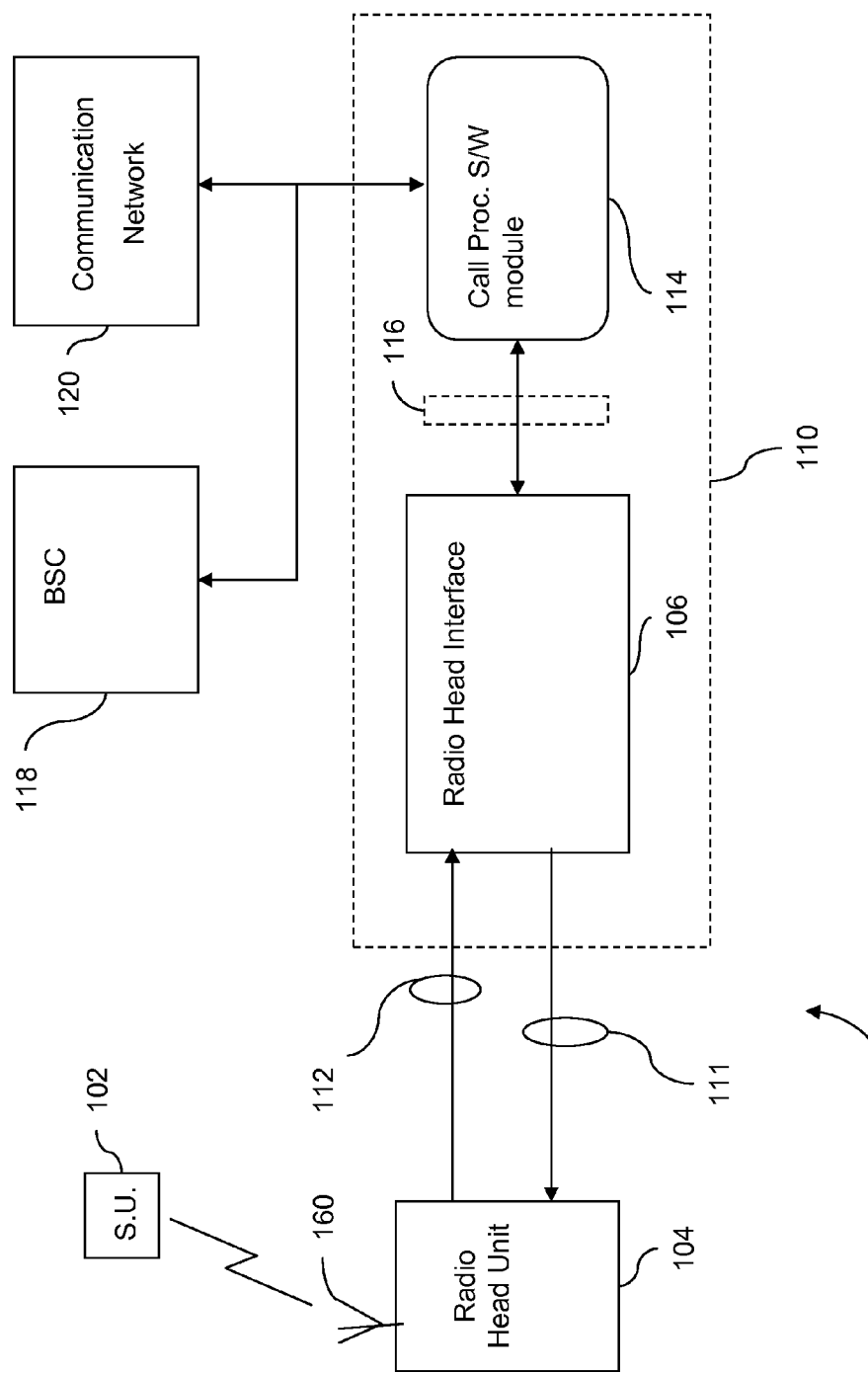
FIGS. 1A, 1B and 1C are illustrations of a communications system of one embodiment of the present invention.

FIG. 1A is a block diagram of one embodiment of a communication system shown generally at 100. Communication system 100 includes one or more subscriber units 102 (or mobile devices 102) within a service area of a radio head unit 104. Radio head unit 104 is coupled to one or more servers 110 (or BTS 110) over one or more transport mediums 111, and 112. In one embodiment, transport mediums 111 and 112 comprise one or more high speed transport mediums. BTS 110 is connected to one or more communication networks 120 (e.g. public switched telephone network (PSTN), Internet, a cable network, or the like). In one embodiment, BTS 110 is connected to one or more communications networks through a base station controller (BSC) 118. One or more cellular antennas 160, adapted for receiving cellular signals from one or more subscriber units 102, are coupled to radio head unit 104. In one embodiment, network 100 is a bidirectional network and as shown includes equipment for forward links (i.e. transmissions on forward logical channels from communications network 120 to mobile device 102) and reverse links (i.e. transmissions on reverse logical channels from mobile device 102 to communications network 120).

In some embodiments, additional reverse links are also provided that duplicate the reverse logical channels. In some embodiments, this set of duplicate reverse logical channels are called diversity channels. It should be understood that descriptions in this specification relating to embodiments of reverse logical channels also apply to such diversity channels. Further details pertaining to the advantages and operation of diversity channels are provided in the '676 Application incorporated herein by reference.

BTS 110 includes a call processing software module 114 (or call processing software 114) that interfaces with one or more communication networks 120. In one embodiment, call processing software module 114 is comprised of one or more software applications. Call processing software module 114 also includes programming which implements an SDR with the BTS 110 and radio head unit 104 hardware, digitally performing waveform processing to modulate and demodulate radio signals transmitted and received, respectively, from the cellular antennas 160. In one embodiment, call processing software module 114 is a Vanu, Inc., Vanu Software Radio.

In one embodiment, BTS 110 communicates with radio head unit 104 through radio head interface module 106 (or radio head interface 106). In one embodiment, BTS 110 comprises a general purpose computer adapted with one or more cards functioning as radio head interface module 106. Radio head interface module 106 establishes high speed digital communication paths for two or more sets of base band data stream logical channels and all communication between BTS 110 and radio head unit 104 goes through radio head interface 106. In another embodiment, BTS 110 comprises a specialized computing device that may include, but is not limited to, a digital signal processor.

Radio head interface module 106, radio head unit 104, and call processing software module 114, all handle multiple types of modulation protocols, and in different embodiments, one or more of the logical channels transmit data using a different modulation protocol than another logical channel. In one embodiment, radio head interface module 106, radio head unit 104, and call processing software module 114, handle modulation protocols for one or more of, but not limited to, Advanced Mobile Phone System (AMPS), code division multiple access (CDMA), Wide-band CDMA (WCDMA), time division multiple access (TDMA), Global System for Mobile communications (GSM), Cellular Digital Packet Data (CDPD), Enhanced Data rates for GSM Evolution (EDGE), General Packet Radio Service (GPRS), Integrated Digital Enhanced Network (iDEN), Orthogonal Frequency Division Multiplexing (OFDM), or any other appropriate modulation protocol. A modulation protocol is commonly also referred to as an air interface standard, a modulation standard, an air interface protocol, or an air interface modulation protocol. For each logical channel, call processing software module 114 performs modulation and demodulation of forward and reverse logical channel voice and data streams using one or more of the air interface standard protocols. In one embodiment, the forward and reverse logical channel data streams carry complex RF data samples representing voice and data communications. Some modulation protocols operate on multiple bands. For example, the GSM protocol can be implemented in the 850 MHz, 900 MHz, 1.8 GHz or 1.9 GHz bands. For such modulation protocols, each logical channel is configured to implement one communications protocol within a specific bandwidth.

In one embodiment, radio head interface module 106 is coupled to BTS 110 through an interface device 116. In one embodiment, interface device 116 is one of, but not limited to a PCI-X interface, an ATCA interface, a PCI Express interface, a Gigabit Ethernet interface, a SCSI interface, a Rocket I/O interface, a UDP/IP link interface, a TCP/IP link interface, a Serial ATA interface, a Card bus for PCMIA card interface, a high speed serial interface or a high speed parallel interface. During initial configuration of communication system 100, digital up-converter (DUC) and digital down-converter (DDC) parameters are loaded into radio head interface 106 for one or more of the protocols supported by radio head unit 104. Such parameters include, but are not limited to, filter coefficients, NCO frequencies, and sampling rates necessary to support valid RF channel, signal bandwidth, signal gain, and protocol configurations. Additional details regarding the parameters, configuration and operation of DUCs and DDCs are discussed in the '673 and '677 Applications, incorporated herein by reference. In one embodiment, the parameters are stored in a table in memory 136 in radio head interface 106.

Embodiments of the present invention enable radio head interface 106 to dynamically reconfigure a logical channel in order to optimize the use of all available logical channels given current demands for various supported protocols and bandwidth allocations.

Figure 1B:
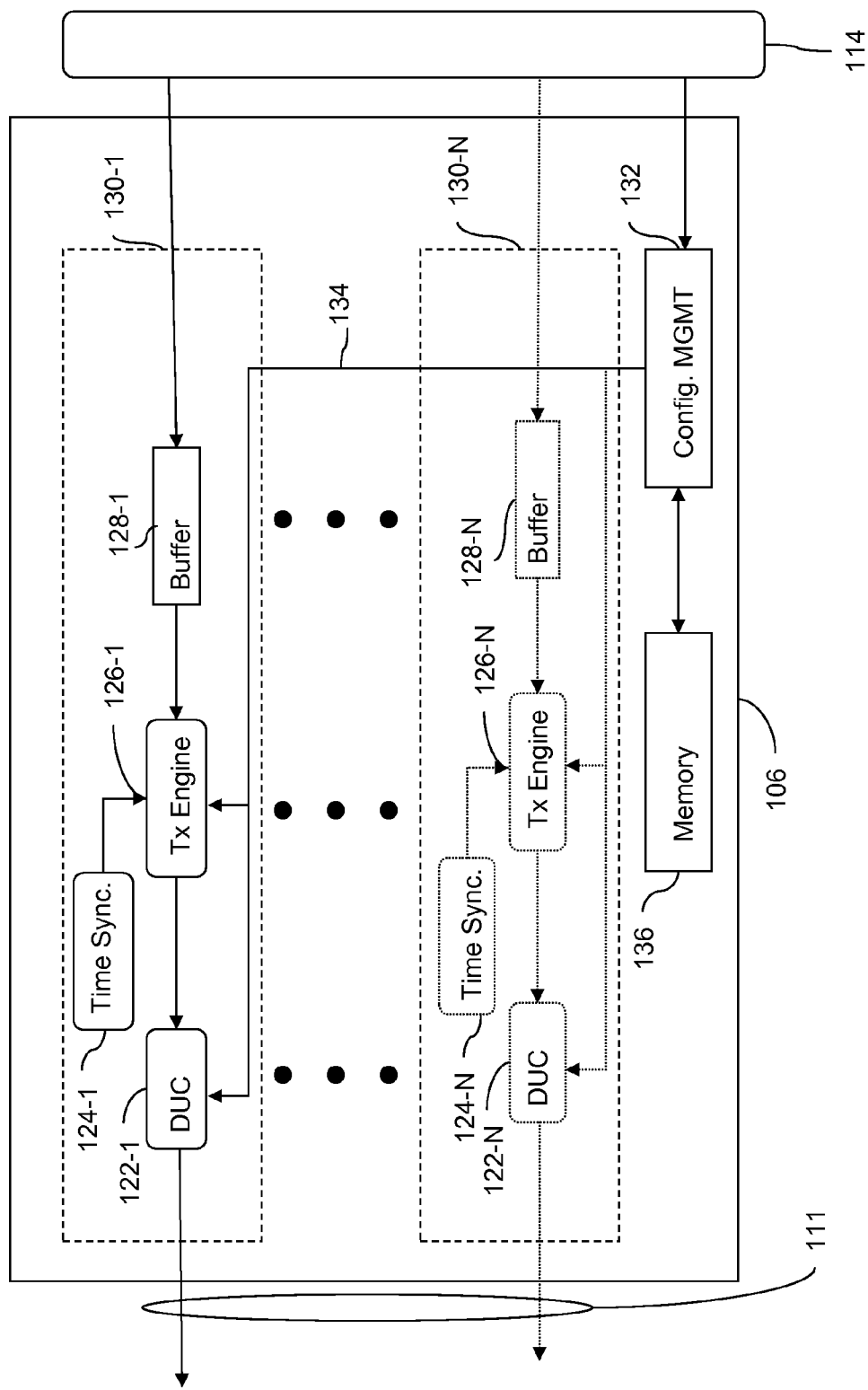

FIG. 1B illustrates one embodiment of a forward logical channel 130-1 data path. A radio head interface forward logical channel comprises a transmit buffer 128-1, a transmit engine 126-1, a DUC 122-1 and a time synchronizer 124-1. In one embodiment, radio head interface card 106 comprises a plurality of M forward logical channels 130-1 through 130-M each having transmit buffers 128-1 through 126-M, transmit engines 126-1 through 126-M, DUCs 122-1 through 122-M and time synchronizers 124-1 through 124-M.

In one embodiment, radio head interface 106 is dynamically reconfigured to change modulation protocol for forward logical channel 130-1. In operation, in one embodiment, transmit buffer 128-1 contains a page of complex RF data samples (received from call processing software module 114) waiting for transmission to radio head unit 104. Transmit engine 126-1 removes a page of complex data samples from the transmit buffer 128-1 and sends the data samples to DUC 122-1. In one embodiment, transmit engine 126-1 holds the page of complex data samples until time synchronizer 124-1 determines that the current time matches a start time code embedded within the page. When the two times match, transmit engine 126-1 starts transmitting the page of complex data samples to DUC 122-1.

In one embodiment, a configuration management unit 132 receives information from call processing software module 114 to reconfigure logical channel 130-1 for a new modulation protocol. A configuration management unit 132 looks up associated parameters for the modulation protocol from a table located in a memory unit 136. Through a control channel 134, configuration management unit 132 loads appropriate filter coefficients and transfer rate to DUC 122-1. In one embodiment, DUC 122-1 is adapted with a buffer memory that holds the parameters received from configuration management unit 132. In one embodiment, transmit engine 126-1 sends a synchronization signal to DUC 122-1 to load the parameters from the buffer memory into DUC 122-1's active registers. Once the parameters are loaded into the active registers, logical channel 130-1 begins operation under the modulation protocol specified by call processing software 114.

In one embodiment, radio head interface 106 is dynamically reconfigured to change the signal bandwidth allocation for forward logical channel 130-1. In operation, in one embodiment, configuration management unit 132 receives information from call processing software module 114 to reconfigure the signal bandwidth allocation for logical channel 130-1. Configuration management unit 132 looks up the associated parameters for the new signal bandwidth allocation from the table located in memory unit 136. Through control channel 134 configuration management unit 132 loads the appropriate parameters to DUC 122-1. In one embodiment, DUC 122-1 is adapted with a buffer memory which holds the parameters received from configuration management unit 132. In one embodiment, transmit engine 126-1 sends a synchronization signal to DUC 122-1 to load the parameters and sampling rates from buffer memory into DUC 122-1's active registers. Once the parameters are loaded into the active registers, logical channel 130-1 is ready to begin operation with the new signal bandwidth allocation.

Figure 1C:
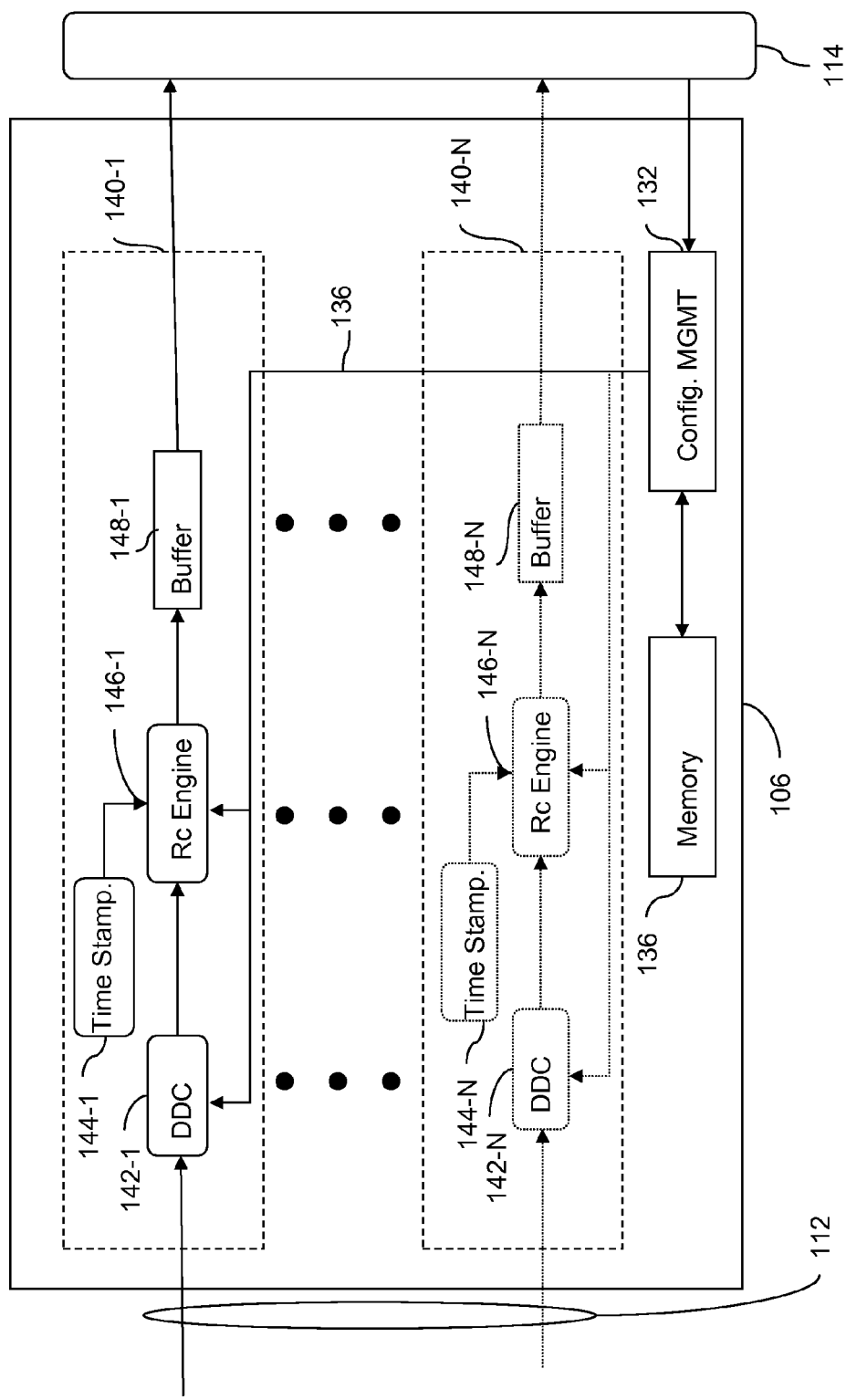

In FIG. 1C, one embodiment of the present invention for a reverse logical channel 140-1 data path is illustrated. A radio head interface 106 reverse logical channel 140-1 comprises a receiver buffer 148-1, a receive engine 146-1, a DDC 142-1 and a time stamper 144-1. In one embodiment, radio head interface card 106 comprises a plurality of N reverse logical channels 140-1 through 140-N each having receiver buffers 148-1 through 148-N, receive engines 146-1 through 146-N, DDCs 142-1 through 142-N and time stampers 144-1 through 144-N.

In one embodiment, radio head interface 106 is dynamically reconfigured to change modulation protocol for reverse logical channel 140-1. In operation, in one embodiment, receive engine 146-1 receives complex data samples from DDC 142-1 and places them into a receiver buffer 148-1. As receiver buffer 148-1 fills, it creates a page of complex data samples. Time stamper 144-1 places, in a page header, the time the first complex data sample was received from DDC 142-1. The completed page is subsequently received and processed by call processing software module 114. In one embodiment, configuration management unit 132 receives information from call processing software module 114 to reconfigure logical channel 140-1 for a new modulation protocol. A configuration management unit 132 looks up the associated parameters for the modulation protocol from the table located in memory unit 136. Through control channel 134 configuration management unit 132 loads the appropriate parameters to DDC 142-1. In one embodiment, DDC 142-1 is adapted with a buffer memory that holds the parameters received from configuration management unit 132. In one embodiment, an associated forward logical channel 130-1's transmit engine 126-1 sends a synchronization signal to DDC 142-1 to load the parameters from the buffer memory into DDC 142-1's active registers. Once the parameters are loaded into the active registers, the logical channel 140-1 is ready to begin operation under the new modulation protocol.

In one embodiment, radio head interface 106 is dynamically reconfigured to change the signal bandwidth allocation for reverse logical channel 140-1. In operation, in one embodiment, configuration management unit 132 receives information from call processing software module 114 to reconfigure the signal bandwidth allocation for logical channel 140-1. Configuration management unit 132 looks up the associated parameters for the new signal bandwidth allocation from the table located in memory unit 136. Through control channel 134 configuration management unit 132 loads the appropriate filter parameters and transfer rate to DDC 142-1. In one embodiment, DDC 142-1 is adapted with a buffer memory that holds the filter parameters and transfer rate received from configuration management unit 132. In one embodiment, an associate forward logical channel 130-1's transmit engine 126-1 sends a synchronization signal to DDC 142-1 to load the filter parameters and transfer rate from the buffer memory into DDC 142-1 's active registers. Once the filter parameters and transfer rate are loaded into the active registers, logical channel 140-1 is ready to begin operation within the new signal bandwidth allocation specified by call processing software module 114.

In one embodiment of the present invention, the base station 110 determines the optimal signal bandwidth allocation for the available logical channels and dynamically reconfigures the logical channels to support changing demands for bandwidth as described in the preceding embodiments.

In one embodiment, for each logical channel, information provided to radio head interface 106 by call processing software module 114 to initiate a protocol or bandwidth change may include one or more of, but not limited to: a modulation protocol, a bandwidth allocation, RF channels, and a timing trigger designating when to perform the change.

In one embodiment, the timing trigger is a designated time based off of radio head interface 106's internal time count. When radio head interface 106's time count reaches the designated time, transmit engine 126-1 sends a signal to DUC 122-1 to load the parameters provided by configuration management unit 132. Whatever data sample is contained in transmit buffer 128-1 at that time are loaded to DUC 122-1 and transmitted in the new protocol, or within the new bandwidth, as specified by call processing software module 114. For the associated reverse logical channel 140-1, when radio head interface 106's time count reaches the designated time, transmit engine 126-1 sends a signal to DDC 142-1 to load the parameters provided by configuration management unit 132. Data samples received from radio head unit 104, processed by DDC 142-1, and received in receiving buffer 148-2 will be processed by call processing software 114 as required by the new modulation protocol, or within the new signal bandwidth allocation.

In one embodiment, the timing trigger is a designated trigger data sample that designates when to perform the change, instead of a designated time. For example, in one embodiment the designated trigger data sample is the 32 bit hex quadword DDDDDDDDh. Transmit engine 126-1 scans data pages received from transmit buffer 128-1 for a designated trigger data sample DDDDDDDDh. Upon receipt of that data sample transmit engine 126-1 sends a signal to DUC 122-1 to load the parameters provided by configuration management unit 132. Whatever data sample is contained in transmit buffer 128-1 at that time will be loaded to DUC 122-1 and transmitted in the new protocol (or within the new signal bandwidth allocation). For the associated reverse logical channel 140-1, upon receipt of the designated trigger data sample transmit engine 126-1 sends a signal to DDC 142-1 to load the parameters provided by configuration management unit 132. Data samples received from radio head unit 104, processed by DDC 142-1, and received in receiving buffer 148-2 are processed by call processing software 114 as required by the new modulation protocol (or within the new signal bandwidth allocation).

In one embodiment, configuration management unit 132 is adapted to know the different modulation protocols supported by the radio head unit 104 hardware, and the associated valid ranges of RF channels and signal bandwidths, based on the parameter table stored in memory unit 136. In one embodiment, the modulation protocols and the associated valid ranges of RF channels and signal bandwidths are loaded into memory unit 136 during the initial configuration of communications system 100. In some embodiments, when call processing software module 114 instructs radio head interface 106 to configure a logical channel for a non-supported protocol or bandwidth, radio head interface 106 generates an error condition flag to call processing software module 114. In one embodiment, when call processing software module 114 instructs radio head interface 106 to change protocol or bandwidth at an invalid designated time, radio head interface 106 generates an error condition flag to call processing software module 114. In one embodiment, radio head interface 106 is adapted to disregard instructions from call processing software module 114 that result in the generation of an error condition flag.

FIG. 2 is a flow chart of one embodiment of dynamic protocol configuration, based on the apparatus of FIGS. 1A, 1B and 1C of the present invention, shown generally at 200. A BTS determines the need to change an operating protocol of a logical channel (210). At step (220), the BTS selects the logical channel to be reconfigured for a different protocol and communicates reconfiguration information to a radio head interface. In one embodiment, reconfiguration information includes one or more of: the new protocol assignment, an RF channel assignment, and timing trigger indicating when to perform the protocol reconfiguration. In one embodiment, the timing trigger indicates a designated time based on a radio head interface internal clock. In one embodiment, the timing trigger is a specific data sample within a page of complex data samples. Proceeding to step (230), the radio head interface determines whether the reconfiguration information is valid for the radio head hardware coupled to the radio head interface. In one embodiment, radio head interface further verifies that the protocol assignment is valid. In one embodiment, radio head interface further verifies that the RF channel assignment is valid for the protocol being assigned to a logical channel. In one embodiment, the radio head interface further verifies that the timing trigger is valid, when the trigger is in the form of a designated time. At (240), a configuration management unit determines the associated DUC/DDC parameters (DUC parameters for forward direction logical channels and DDC parameters for reverse direction logical channels) and sampling rate required for newly assigned protocol. In one embodiment, the configuration management unit loads the parameters and sampling rate into DUC/DDC buffers. At (250), when the timing trigger arrives, the DUC/DDC is reconfigured with the new parameters and sampling rate.

FIG. 3 is a flow chart of one embodiment of dynamic signal bandwidth allocation, based on the apparatus of FIGS. 1A, 1B and 1C, shown generally at 300. Starting at step (310), a BTS determines the need to change the signal bandwidth allocation for a logical channel. At step (320), the BTS selects the logical channel to be reconfigured and communicates reconfiguration information to the radio head interface. In one embodiment, the reconfiguration information includes one or more of: a bandwidth and a timing trigger indicating when to perform the signal bandwidth allocation change. In one embodiment, the timing trigger indicates a designated time based on a radio head interface internal clock. In one embodiment, the timing trigger is a specific data sample within a page of complex data samples. Proceeding to step (330), the radio head interface determines whether the reconfiguration information is valid for the radio head hardware coupled to the radio head interface. In one embodiment, the radio head interface further verifies that the timing trigger is valid. At (340), a configuration management unit determines the associated DUC/DDC parameters (DUC parameters for forward direction logical channels and DDC parameters for reverse direction logical channels) and sampling rate. In one embodiment, the configuration management unit loads the parameters and sampling rate into DUC/DDC buffers. At (350), when the timing trigger arrives, the DUC/DDC is reconfigured with the new parameters.

In one embodiment information regarding dynamic signal bandwidth allocation and protocol configuration is communicated from the BTS to the radio head interface configuration management unit through a data sample page header. In one embodiment, call processing software module 114 outputs to logical channel 130-1's transmit buffer 128-1 a page of complex RF data samples representing voice and data communications. Prefixed to the data samples, is a page header that in one embodiment includes one or more of, but not limited to, a start of page indicator, a protocol assignment code, a signal bandwidth indicator (BWI), signal bandwidth allocation parameters, a protocol reconfiguration indicator (PRI), protocol assignment parameters, RF frequency channel parameters, a time start code, and a timing trigger. Further details concerning the contents of a complex data sample page or information embedded within a page header are described in the '675 Application herein incorporated by reference.

In one embodiment, transmit engine 126-1 removes the page header, sending only the complex data samples representing voice and data communications to DUC 122-1. Transmit engine 126-1 further evaluates the header for indicator flags. In one embodiment, when transmit engine 126-1 identifies a PRI flag, then one or more of, a protocol assignment code, a RF frequency assignment code, and a timing trigger are further read from the page header and communicated to configuration management unit 132. As described previously, configuration management unit 132 then looks up associated parameters to reconfigure DUC 122-1. In one embodiment, the page header includes reconfiguration information for associated reverse logical channel 140-1. In that case, transmit engine 126-1 communicates the reconfiguration information to configuration management unit 132 that then looks up associated parameters to reconfigure DDC 142-1.

In one embodiment, when transmit engine 126-1 identifies a BWI flag, then one or more of signal bandwidth allocation parameters and a timing trigger are further read from the page header and communicated to configuration management unit 132. As described previously, configuration management unit 132 then looks up associated parameters to reconfigure DUC 122-1. In one embodiment, the page header includes reconfiguration information for associated reverse logical channel 140-1. In that case, transmit engine 126-1 communicates the reconfiguration information to configuration management unit 132 that then looks up associated parameters to reconfigure DDC 142-1.

Several ways are available to implement the radio head interface modules, software modules (e.g. call processing software modules), and BTS elements of the current invention. These include, but are not limited to systems such as, digital computer systems, programmable controllers, digital signal processors, or field programmable gate arrays. Therefore other embodiments of the present invention are the program instructions resident on computer readable media which when implemented by such systems, enable the systems to implement embodiments of the present invention. Computer readable media include any form of computer memory, including but not limited to punch cards, magnetic disk or tape, or any other magnetic data storage system, any optical data storage system, flash ROM, non-volatile ROM, PROM, E-PROM or RAM, or any other form of permanent, semi-permanent, or temporary memory storage system or device.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A communications system, comprising:
   a base station, including:
   one or more radio head interface modules; and
   a signal processing module, the one or more radio head interface modules adapted to communicate with the signal processing module;
   wherein the signal processing module performs modulation and demodulation of voice and data streams using one or more air interface protocols; and
   a radio head unit coupled to the one or more radio head interface modules over one or more transport mediums;
   wherein the radio head unit communicates with one or more subscriber units using the one or more air interface protocols;
   wherein the one or more radio head interface modules receives reconfiguration information from the signal processing module, the reconfiguration information including at least one of air interface protocol parameters and bandwidth allocation information;
   wherein the one or more radio head interface modules reconfigures itself for one or more communications channels, based on the reconfiguration information;
   wherein the one or more radio head interface modules further comprises:

a transmit buffer, the transmit buffer adapted to receive a data stream from the signal processing module and store the data stream as a page of data sample;

a transmit engine;

a digital upconverter, the transmit engine adapted to transfer the page of data samples from the transmit buffer to the digital upconverter;

a configuration management unit adapted to receive air interface protocol configuration information from the signal processing module;

a memory adapted with digital upconverter parameters;

wherein the configuration management unit is further adapted to access the memory to lookup digital upconverter parameters based on the reconfiguration information; and wherein the configuration management unit is further adapted to output the digital upconverter parameters to the digital up converter.

2. The system of claim 1, wherein the base station further comprises:

one or more interface devices, wherein the one or more radio head interface modules communicate with the signal processing module over the one or more interface devices.

3. The system of claim 2, wherein the one or more interface devices includes at least one of a PCI-X interface, an ATCA interface, a PCI Express interface, a Gigabit Ethernet interface, a SCSI interface, a Rocket I/O interface, a UDP/IP link interface, a TCP/IP link interface, a Serial ATA interface, a Card bus for PCMIA card interface, a high speed serial interface and a high speed parallel interface.

4. The system of claim 1, wherein one or more air interface protocols include at least one of Global System for Mobile communications (GSM), Advanced Mobile Phone System (AMPS), code division multiple access (CDMA), Wide-band CDMA, time division multiple access (TDMA), Cellular Digital Packet Data (CDPD), Enhanced Data rates for GSM Evolution (EDGE), General Packet Radio Service (GPRS), Integrated Digital Enhanced Network (iDEN), and Orthogonal Frequency Division Multiplexing (OFDM).

5. The system of claim 1, wherein the signal processing module communicates one or more pages of data samples with the one or more radio head interface modules, each of the one or more pages of data samples having a page header; and wherein reconfiguration information is contained in the page header.

6. The system of claim 1, wherein air interface protocol parameters include at least one of a protocol reconfiguration indicator, modulation protocol assignment parameters, and a timing trigger.

7. The system of claim 6, wherein the timing trigger is one of a designated time and a designated data sample.

8. The system of claim 7, wherein the designated time correlates to a time count internal to the one or more radio head interface modules.

9. The system of claim 1, wherein the signal bandwidth allocation information comprises a timing trigger and signal bandwidth allocation parameters for one or more communication channels.

10. The system of claim 9, wherein the timing trigger is one of a designated time and a designated data sample.

11. The system of claim 10, wherein the designated time correlates to a time count internal to the one or more radio head interface modules.

12. The system of claim 1, wherein the configuration management unit is further adapted to access the memory to lookup the associated digital upconverter parameters based on the reconfiguration information; and wherein the configuration management unit is further adapted to output the associated parameters to the digital up converter.

13. The system of claim 1, wherein the one or more radio head interface modules further comprises:

a receive buffer;

a receive engine; and a digital downconverter;

the transmit engine adapted to transfer a data stream from the digital downconverter to the receive buffer, the receive buffer adapted to store the data stream as a page of data samples, the receive buffer further adapted to output the page of data samples to the signal processing module;

the memory further adapted with digital downconverter parameters;

wherein the configuration management unit is further adapted to access the memory to lookup the digital downconverter parameters based on the reconfiguration information; and wherein the configuration management unit is further adapted to output the digital downconverter parameters to the digital downconverter.

14. The system of claim 13, wherein the configuration management unit is further adapted to access the memory to lookup the associated digital downconverter parameters based on the reconfiguration information; and wherein the configuration management unit is further adapted to output the associated parameters to the digital downconverter.

15. The system of claim 1, wherein the transport mediums are one or more of optical fiber, millimeter wave, coaxial cable, and Free Space Optics (FSO).

16. A radio head interface module, the module comprising:

a transmit buffer, the transmit buffer adapted to receive a data stream from a signal processing module and store the data stream as a page of data samples having a page header;

a transmit engine;

a digital upconverter, the transmit engine adapted to transfer the page of data samples from the transmit buffer to the digital upconverter;

a configuration management unit adapted to receive reconfiguration information from the signal processing module, the reconfiguration information including at least one of air interface protocol parameters and bandwidth allocation information; and a memory adapted with digital upconverter parameters;

wherein the configuration management unit is further adapted to access the memory to lookup associated digital upconverter parameters based on the reconfiguration information;

wherein the configuration management unit is further adapted to output the associated digital upconverter parameters to the digital up converter.

17. The one or more radio head interface modules of claim 16, the module further comprising:

a receive buffer;

a receive engine; and a digital downconverter;

the receive engine adapted to transfer a data stream from the digital downconverter to the receive buffer, the receive buffer adapted to store the data stream as a page of data samples, the receive buffer further adapted to output the page of data samples to the signal processing module;

the memory further adapted with digital downconverter parameters;

wherein the configuration management unit is further adapted to access the memory to lookup the associated digital downconverter parameters based on the reconfiguration information; and wherein the configuration management unit is further adapted to output the associated digital downconverter parameters to the digital downconverter.

* * * * *